(12) United States Patent
Uselton et al.

(10) Patent No.: US 9,178,337 B2
(45) Date of Patent: Nov. 3, 2015

(54) PREMISES POWER SOURCE ACCESSORY PANEL FOR AN OUTDOOR UNIT AND METHOD OF ADAPTING AN OUTDOOR UNIT WITH THE SAME

(71) Applicant: Lennox Industries, Inc., Richardson, TX (US)

(72) Inventors: Robert B. Uselton, Plano, TX (US); Timothy J. Brizendine, Caddo Mills, TX (US)

(73) Assignee: Lennox Industries Inc., Richardson, TX (US)

( * ) Notice: Subject to any disclaimer, the term of this patent is extended or adjusted under 35 U.S.C. 154(b) by 73 days.

(21) Appl. No.: 14/108,971

(22) Filed: Dec. 17, 2013

(65) Prior Publication Data
US 2014/0104760 A1    Apr. 17, 2014

Related U.S. Application Data

(62) Division of application No. 12/975,479, filed on Dec. 22, 2010, now Pat. No. 8,634,182.

(60) Provisional application No. 61/295,941, filed on Jan. 18, 2010.

(51) Int. Cl.
| H05K 7/20 | (2006.01) |
| H02B 1/40 | (2006.01) |
| F24F 1/20 | (2011.01) |

(52) U.S. Cl.
CPC .. *H02B 1/40* (2013.01); *F24F 1/20* (2013.01); *Y10T 29/49002* (2015.01)

(58) Field of Classification Search
USPC ............ 361/601, 622, 627, 634, 647, 673, 361/676–678, 688–691, 825, 831–832, 837
See application file for complete search history.

(56) References Cited

U.S. PATENT DOCUMENTS

| 3,960,322 A | 6/1976 | Ruff et al. |
| 4,018,581 A | 4/1977 | Ruff et al. |

(Continued)

FOREIGN PATENT DOCUMENTS

| CN | 1219230 A | 6/1999 |
| CN | 1261650 A | 8/2000 |

(Continued)

OTHER PUBLICATIONS

Translation of Chinese Office Action dated Feb. 28, 2014, Applicant: Lennox Industries, Inc., 8 pages.

(Continued)

*Primary Examiner* — Courtney Smith
(74) *Attorney, Agent, or Firm* — R. Johnston Law, PLLC

(57) ABSTRACT

An outdoor unit of an HVAC system comprises a frame, at least one refrigerant coil mounted to the frame, a fan motor, a compressor, a controller, and a premises power source accessory panel. The fan motor is coupled to a fan which drives air through the refrigerant coil. The compressor is coupled to the refrigerant coil to drive refrigerant therethrough. The controller is coupled to the fan motor and compressor. The premises power source accessory panel is removably coupled to the frame and includes a bracket and circuit protection element. The bracket has at least one electrical conduit aperture. The circuit protection element is mounted to the bracket and coupleable to a premises power source. The premises power source is a renewable-energy power source located on a premises of the HVAC system. The bracket is removably coupleable to the outdoor unit in lieu of a conventional electrical conduit panel.

12 Claims, 6 Drawing Sheets

(56) References Cited

U.S. PATENT DOCUMENTS

| | | | |
|---|---|---|---|
| 4,327,396 A * | 4/1982 | Schacht | 361/676 |
| 5,515,235 A | 5/1996 | Stoller | |
| 5,801,632 A | 9/1998 | Opal | |
| 5,826,435 A | 10/1998 | Hange | |
| 6,053,004 A | 4/2000 | Beppu et al. | |
| 6,263,692 B1 | 7/2001 | Nakanuma et al. | |
| 6,486,399 B1 * | 11/2002 | Armstrong et al. | 174/58 |
| 6,795,300 B1 * | 9/2004 | Holley | 361/601 |
| 7,310,966 B2 | 12/2007 | Wagner | |
| 7,361,832 B2 * | 4/2008 | Dively | 174/38 |
| 8,152,542 B2 * | 4/2012 | Kucera et al. | 439/142 |
| 2003/0221439 A1 * | 12/2003 | Bush et al. | 62/285 |
| 2005/0103615 A1 | 5/2005 | Ritchey | |
| 2005/0242690 A1 | 11/2005 | Perkins et al. | |
| 2006/0288720 A1 | 12/2006 | Jmaev | |
| 2007/0089444 A1 | 4/2007 | Chen | |
| 2007/0284370 A1 | 12/2007 | Dively | |
| 2008/0000247 A1 | 1/2008 | Sinha et al. | |
| 2009/0133423 A1 | 5/2009 | Jang et al. | |
| 2010/0034677 A1 | 2/2010 | Uselton | |
| 2010/0127572 A1 | 5/2010 | Uselton et al. | |
| 2011/0204720 A1 * | 8/2011 | Ruiz et al. | 307/66 |
| 2011/0310534 A1 | 12/2011 | Casley et al. | |
| 2012/0162862 A1 * | 6/2012 | Cosley et al. | 361/644 |
| 2012/0176732 A1 * | 7/2012 | Cosley et al. | 361/622 |

FOREIGN PATENT DOCUMENTS

| | | |
|---|---|---|
| CN | 1959227 A | 5/2007 |
| CN | 101440982 A | 5/2009 |

OTHER PUBLICATIONS

Foreign Communication from a Related Application; Chinese Application No. 201110009911.7; Office Action dated Oct. 23, 2014; 16 pages.

* cited by examiner

PREMISES POWER SOURCE ACCESSORY PANEL FOR AN OUTDOOR UNIT AND METHOD OF ADAPTING AN OUTDOOR UNIT WITH THE SAME

CROSS-REFERENCE TO RELATED APPLICATION

This application is a Divisional of U.S. Ser. No. 12/975,479 filed on Dec. 22, 2010 to Robert B. Uselton, et al. entitled "Premises Power Source Accessory Panel for an Outdoor Unit and Method of Adapting an Outdoor Unit with the same" currently allowed and commonly assigned with this application and incorporated herein by reference, which claims the benefit of U.S. Provisional Application Ser. No. 61/295,941, filed by Brizendine, et al., on Jan. 18, 2010, entitled "Solar Panel," commonly assigned with this application and incorporated herein by reference. These applications are also a related to U.S. patent application Ser. No. 12/641,154, filed by Uselton, et al., on Dec. 18, 2009, entitled "Utility-Interactive Inverter System Architecture and Method of Operation Thereof" also commonly assigned and incorporated herein by reference.

TECHNICAL FIELD

This application is directed, in general, to air conditioning systems and, more specifically, to a premises power source accessory panel for an outdoor unit and method of adapting an outdoor unit with the same.

BACKGROUND

Mainstream media has extensively covered efforts to reduce reliance on fossil and nuclear fuels in favor of so-called renewable energy, chief among these being solar and wind energy. Residential and business electric power customers have taken steps to reduce their dependence on the commercial electric power distribution network (commonly called "the grid") and the electric power utilities that sell electric power through it.

The customers reduce net energy draw not only by reducing consumption by, for example, increasing thermal insulation, selecting more energy-efficient equipment (e.g., appliances) and using it more judiciously, but also by drawing at least some of the electric power they need from renewable-energy power sources, including wind turbines and photovoltaic ("solar") panels, they have installed on their own premises. Relatively few of these customers derive enough electric power from these premises power sources to go "off the grid." Instead, most customers remain "on the grid," using the premises power sources as much as possible and drawing the remaining electric power they need from the grid.

Most states have passed laws permitting distributed generation (DG), colloquially known as "grid-tying." DG is the coupling of premises power sources to the existing power grid such that the sources can synchronize with, and supply power to, the grid. To compensate customers having these sources for the power they provide to the grid, states have also passed laws that enable "net-billing" or "net-metering." Net-billing employs a second electric meter, separate from the usual one that measures power a customer takes from the grid, that measures the power that the customer's premises power sources generate. Net-metering uses a single, bidirectional electric meter that keeps track of net power flow to or from the grid.

In response to these opportunities, at least one manufacturer of heating, ventilation and air conditioning (HVAC) systems has begun to integrate premises power sources into its equipment (e.g., the condensing, or "outdoor," units of HVAC or heat pump systems) such that grid-tying can occur when the power provided by the sources exceed that which their systems require.

SUMMARY

One aspect provides an outdoor unit of an HVAC system. In one embodiment, the outdoor unit comprises a frame, at least one refrigerant coil mounted to the frame, a fan motor, a compressor, a controller, and a premises power source accessory panel. The fan motor is coupled to a fan and is configured to drive air through the at least one refrigerant coil. The compressor is coupled to the at least one refrigerant coil to drive refrigerant therethrough. The controller is coupled to the fan motor and compressor. The premises power source accessory panel is removably coupled to the frame and includes a bracket and circuit protection element. The bracket has at least one electrical conduit aperture. The circuit protection element is mounted to the bracket and coupleable to a premises power source. The premises power source is a renewable-energy power source located on a premises of the HVAC system. The bracket is removably coupleable to the outdoor unit in lieu of a conventional electrical conduit panel.

Another aspect provides a method of adapting an outdoor unit of an HVAC system with a premises power source accessory panel. In one embodiment, the method includes selecting a panel appropriate for installation on the outdoor unit installing the panel on the outdoor unit, and connecting at least premises power source to the outdoor unit via the panel if the panel is the premises power source accessory panel. The premises power source is a renewable-energy power source located on a premises of the HVAC system. The panel is selected from the group consisting of a conventional electrical conduit panel and a premises power source accessory panel.

BRIEF DESCRIPTION OF THE DRAWINGS

Reference is now made to the following descriptions taken in conjunction with the accompanying drawings, in which.

DETAILED DESCRIPTION

As stated above, it is desirable to become "greener" and reduce one's dependence on the commercial electric power distribution network. It is also desirable from an economic standpoint to sell excess electricity back to the grid. Further, while some effort has been undertaken to integrate renewable-energy power sources into HVAC equipment, more work can be done. Specifically, what is needed is a relatively straightforward way to integrate premises power sources (which include premises-located renewable-energy power sources and non-renewable power sources) into HVAC equipment without requiring major modifications to the equipment. What is further needed is a way to integrate premises power sources into existing HVAC equipment without having to modify the equipment significantly. What is further needed is a way to integrate premises power sources into already installed HVAC equipment without having to modify the equipment significantly.

Accordingly, various embodiments of a premises power source accessory panel will be introduced herein. In general, the panel is designed to be used in lieu of a panel that does not accommodate premises power sources thereby to integrate renewable-energy power sources and other types of premises power sources into HVAC equipment without requiring major modifications to the equipment. Certain embodiments of the panel are designed to replace an existing panel that does not accommodate premises power sources thereby to integrate renewable-energy power sources and other types of premises power sources into existing HVAC equipment or already-installed HVAC equipment without having to modify the equipment significantly. Various embodiments of the panel are designed for use with an outdoor unit of an HVAC system. For the sake of illustration, and not by way of limitation, these embodiments will be described in the environment of an electric power system associated with an example premises and coupled to the grid. An HVAC system is coupled to the electric power system; the HVAC system has an outdoor unit with which various embodiments of the panel will be associated.

Figure 1:
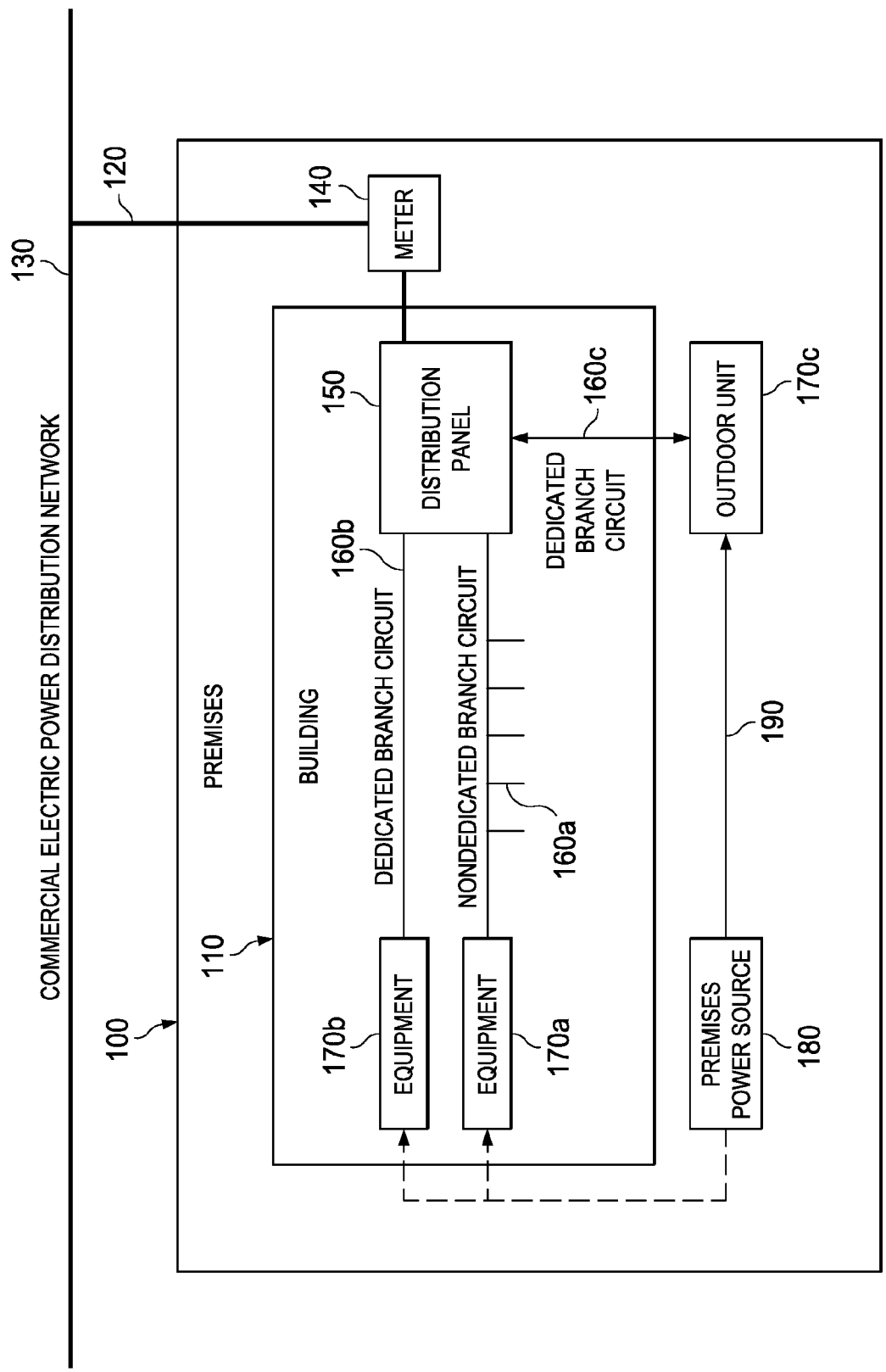
FIG. 1 is a high-level schematic diagram of one embodiment of an electric power system associated with an example premises and coupled to the grid.

FIG. 1 is a high-level schematic diagram of one embodiment of an electric power system associated with an example premises and coupled to the grid. FIG. 1 shows a premises 100. The premises 100 may be land and a building 110 sitting on the land. The building 110 may be a residence, for example a single-family or multi-family residence, an apartment or condominium complex, a commune, a subdivision, a gated community, a master-planned community, a retirement or nursing home or village, a trailer park, a recreational vehicle park or any place where people may live of any conventional or later-developed type. The building 110 may alternatively or additionally be a business, for example a standalone retail or office building, a strip or enclosed mall, a restaurant, a factory, a museum, a warehouse, a hotel, a motel, a resort or a lodge or any place of any other conventional or later-developed type where people may work or play.

A branch 120 of a commercial electric power distribution network 130 (commonly known as the "grid") enters the premises 100 and couples to an electric power meter 140, illustrated in FIG. 1 as being associated with an outer wall of the building 110. A distribution panel 150 is located within the building 110 and coupled to the meter 140. Those skilled in the pertinent art will understand that the meter 140 and the distribution panel 150 may be located anywhere with respect to the building 110 and, indeed, the premises 100 as a whole.

The distribution panel 150 serves as a hub of a premises electric power system. Included in the premises electric power system are several branch circuits that FIG. 1 shows as extending from the distribution panel 150 and around the building 110 and the premises 100. For example, a nondedicated branch circuit 160a extends to a plurality of unreferenced loads (e.g., outlets or lights), indicated by a plurality of unreferenced lines) and a first piece of electrically powered equipment 170a. A dedicated branch circuit 160b extends to a single load, i.e., a second piece of electrically powered equipment 170b. A dedicated branch circuit 160c extends to another single load, i.e., an outdoor unit 170c that forms at least part of an air conditioning system or a heat pump climate control system. For purposes of this description, a dedicated branch circuit is a branch circuit that extends and provides power to a single load, and a nondedicated branch circuit is designed to provide power to more than one load, even though no loads or one load may be coupled to it at certain times. Those skilled in the pertinent art are also aware that outdoor units (which are often located on the ground adjacent to, or the rooftop of, a building) are employed to exchange heat between a closed-circuit coolant loop and the ambient environment to heat or cool coolant flowing through (e.g., hydrofluorocarbon fluid) in the coolant loop.

For purposes of this description, electrically powered equipment is an electrical load of any type, including resistive and reactive loads, and includes all manner of equipment and appliances that may be electrically powered. Specific examples given herein subsume all manner of climate control equipment, including HVAC equipment, heat pump equipment, desiccating equipment and evaporative cooling equipment. However, those skilled in the pertinent art will understand that the teachings herein apply to all manner of electrical load without limitation.

A bus 190 electrically couples a premises power source 180 to the outdoor unit 170c. The premises power source 180 may be any source of electrical power (e.g., a wind turbine, a photovoltaic cell, panel or array, a fuel cell, a battery, a geothermal generator, a hydroelectric generator or any other conventional or later-developed or discovered electrical power source) that is located on the premises 100. The premises power source 180 may produce DC or AC power. Accordingly, the bus 190 may be a DC bus or an AC bus of any appropriate voltage or current capacity. In alternative embodiments, the premises power source 180 produces AC power, produces DC power but then converts the DC power to AC power before transmitting the power along the bus 190 or produces and transmits DC power along the bus 190 for conversion at an intermediate location or a distal end of the bus 190 (the end proximate the outdoor unit 170c or, in alternative embodiments, the first or second pieces of electrically powered equipment 170a, 170b).

Two general embodiments will now be described. In a first embodiment, equipment can use power from two sources: AC power from the electric utility and renewable power from solar photovoltaic modules ("solar panels"). As will be shown, a utility-interactive inverter becomes the bridge for conversion of DC power (from a premises power source) to AC power used by, for example, a compressor, fan motor or other loads in equipment. The output side of the utility-interactive inverter is connected to the "line" side of the equipment contactor (e.g., power relay). A "circuit protection element," such as a circuit breaker, fuse, isolator, suppressor or any other passive or active conventional or later-developed element, typically interposes the inverter and the equipment contactor. Thus connected, the utility-interactive inverter can sense the voltage and phase of the utility provided AC power to synchronize with it. As the compressor or other loads consume power, the amount taken from the electric utility source may then be decreased by the amount of renewable energy that is produced and converted by the utility-interactive inverter. When the compressor and other loads cycle off, the utility-interactive inverter is still connected to the electric grid via the branch circuit of the equipment. The equipment therefore becomes a generation source for running other loads in the building. If the generation capability of the renewable energy system exceeds the loads in the house or building, the power will be exported out to the utility grid. The power meter on the house or building then "turns backwards."

Figure 2:
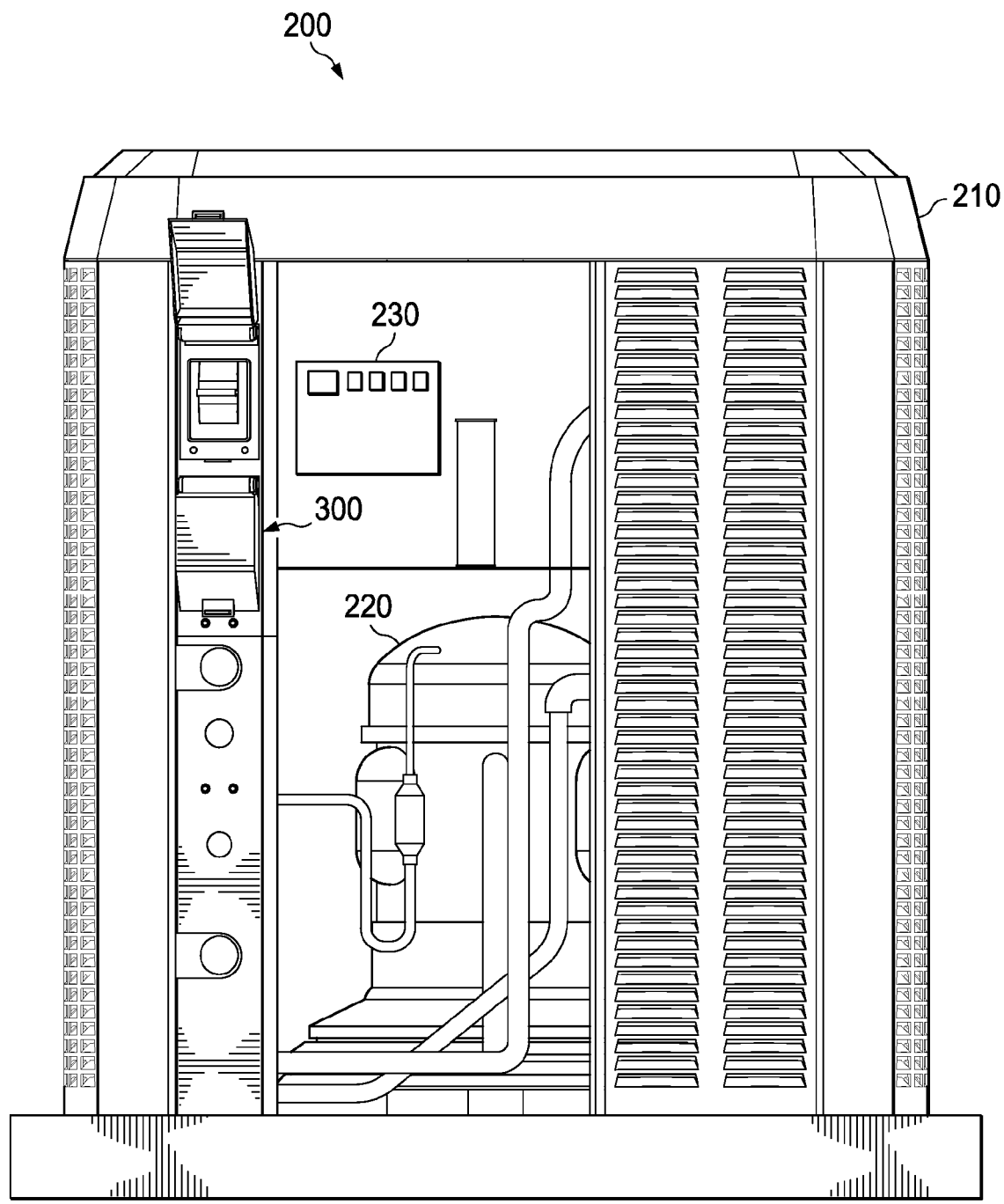
FIG. 2 is an elevational view of one embodiment of an outdoor unit that may be coupled to a premises electric power system.

FIG. 2 is an elevational view of one embodiment of an outdoor unit 200 that may be coupled to a premises electric power system (e.g., as the outdoor unit 170c of FIG. 1 is coupled to the distribution panel 150 of FIG. 1). In one embodiment, the outdoor unit 200 is a condensing unit of an HVAC system. In an alternative embodiment, the outdoor unit 200 is part of a heat pump system. In one embodiment, the outdoor unit 200 sits on a concrete pad. In an alternative embodiment, the outdoor unit 200 sits on a rooftop (a "rooftop unit").

The outdoor unit 200 includes a frame 210 on which are mounted one or more unreferenced refrigerant coils. A fan motor (not shown) is coupled to an unreferenced fan to drive air through the one or more refrigerant coils. A refrigerant compressor or heat pump 220 is coupled to the one or more refrigerant coils to drive refrigerant therethrough. A controller 230 controls the operation of the fan motor, the refrigerant compressor or heat pump 220 and/or other apparatus.

A premises power source accessory panel 300 is removably coupled to the frame 210. Various embodiments of the panel 300 will now be described in conjunction with FIGS. 3-5.

Figure 3:
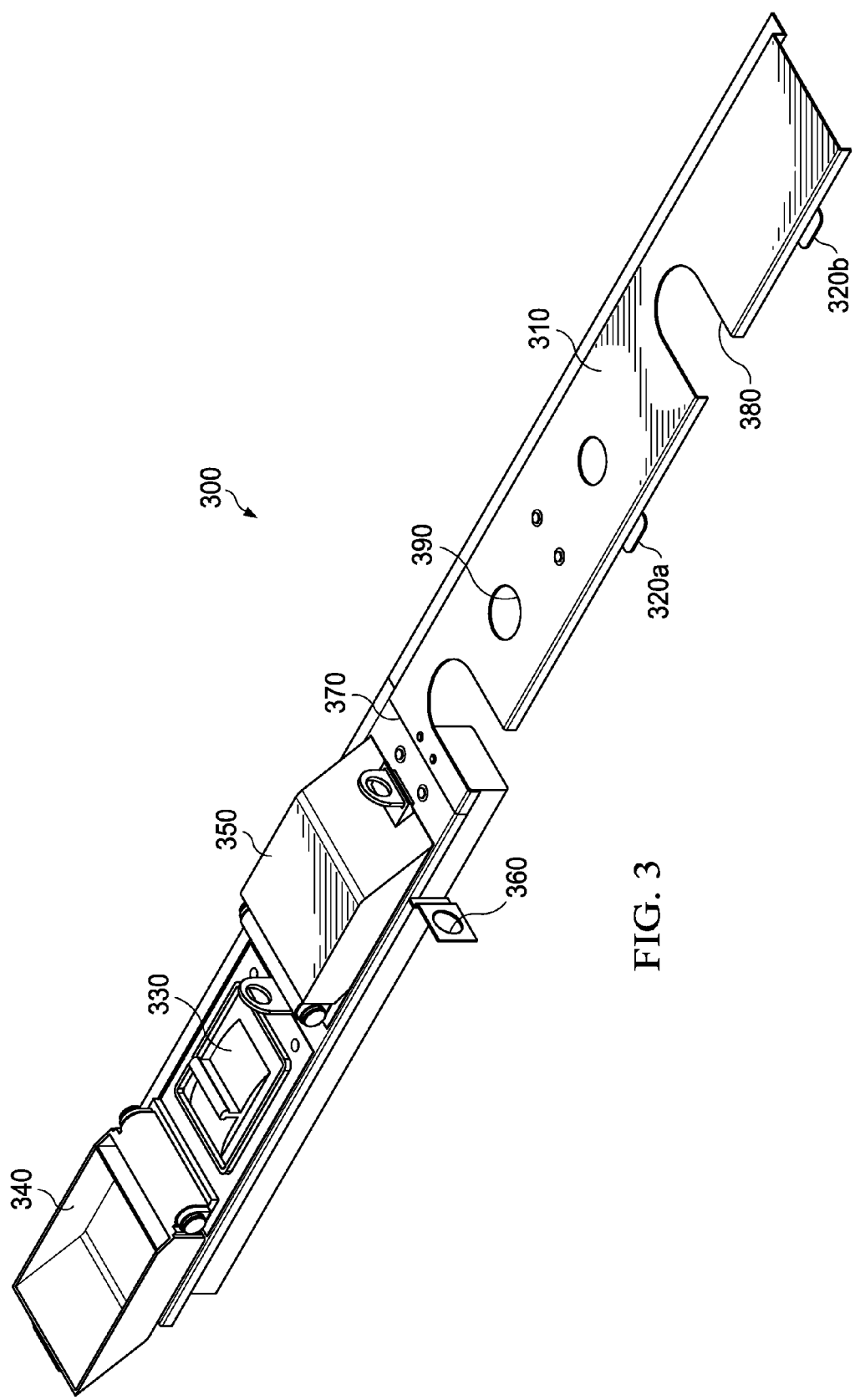
FIG. 3 is an isometric view of one embodiment of a premises power source accessory panel for an outdoor unit shown with weather-resistant circuit protection element covers in respective open and closed positions.

FIG. 3 is an isometric view of one embodiment of a premises power source accessory panel 300 for an outdoor unit shown with weather-resistant circuit protection element covers in respective open and closed positions. The panel 300 includes a bracket 310. In the illustrated embodiment, the bracket 310 is composed predominantly of metal, e.g., steel. In one specific embodiment, the bracket 310 is formed by stamping a metal sheet. In some alternative embodiments, the bracket 310 is composed predominantly of plastic. In the illustrated embodiment, the bracket 310 has one or more tabs 320a, 320b. If present, the tabs 320a, 320b are configured to engage corresponding slots on a frame of an outdoor unit (e.g., the frame 210 of FIG. 2). In such embodiment, the bracket 310 may be installed on the frame by causing the tabs 320a, 320b to enter and engage the corresponding slots on the frame. Then the bracket 310 may be rotated about an axis defined by the tabs 320a, 320b until it becomes substantially coplanar with proximate portions of the frame. At this point, one or more fasteners, such as one or more screws, may be employed to affix the bracket 310 to the frame.

In the illustrated embodiment, the bracket 310 serves as a mount for a first circuit protection element 330 having a weather-resistant cover 340 and a second circuit protection element 350. In FIG. 3, the second circuit protection element 350 is occluded by its cover. In one embodiment, the first circuit protection element 330 is configured to provide both a disconnect function and a fault protection function for the outdoor unit (e.g., the fan motor and refrigerant compressor or heat pump 220 of FIG. 2). In a related embodiment, the second circuit protection element 350 is configured to provide a disconnect function and fault protection for the bus 190 of FIG. 1. Other embodiments have only one circuit protection element for the bus 190. Still other embodiments include other and/or further circuit protection elements for corresponding other and/or further premises power sources. Such embodiments can accommodate multiple premises power sources, e.g., one or more photovoltaic cells and a wind turbine.

The illustrated embodiment of the bracket 310 includes a lateral bracket 360 configured to mount a lightning surge arrester. Alternative embodiments lack the lateral bracket 360.

The illustrated embodiment of the bracket 310 is formed in two sections with a joint 370 located therebetween. This allows a section of the bracket 310 that mounts the first and second circuit protection elements 330, 350 (an upper section as FIG. 3 illustrates the bracket 310) to be sized (e.g., in terms of length and/or width) such that it can accommodate multiple models and/or sizes of outdoor unit. In colloquial terms, that section may be regarded as being at least somewhat "universal" or "generic," which generally results in lower overall manufacturing costs. Consequently, the other section of the bracket (a lower section as FIG. 3 illustrates the bracket 310) is sized in terms of its length, width or other configuration such that it accommodates one or a relatively limited range of models and/or sizes of outdoor unit. In the embodiment of FIG. 3, the lower section of the bracket 310 contains, for example, a refrigerant piping aperture 380 located and sized such that a refrigerant pipe can pass through the panel 300 when it is affixed in place on the frame 210 of FIG. 2. The embodiment of FIG. 3 is illustrated as including at least one electrical conduit aperture 390 configured to receive an electrical conduit (not shown) for providing electric power to the outdoor unit from a premises electric power system. The embodiment of FIG. 3 is illustrated as containing further unreferenced apertures, perhaps for electrical or plumbing purposes or for purposes of mounting one or more further external controls or operational indicators.

Figure 4:
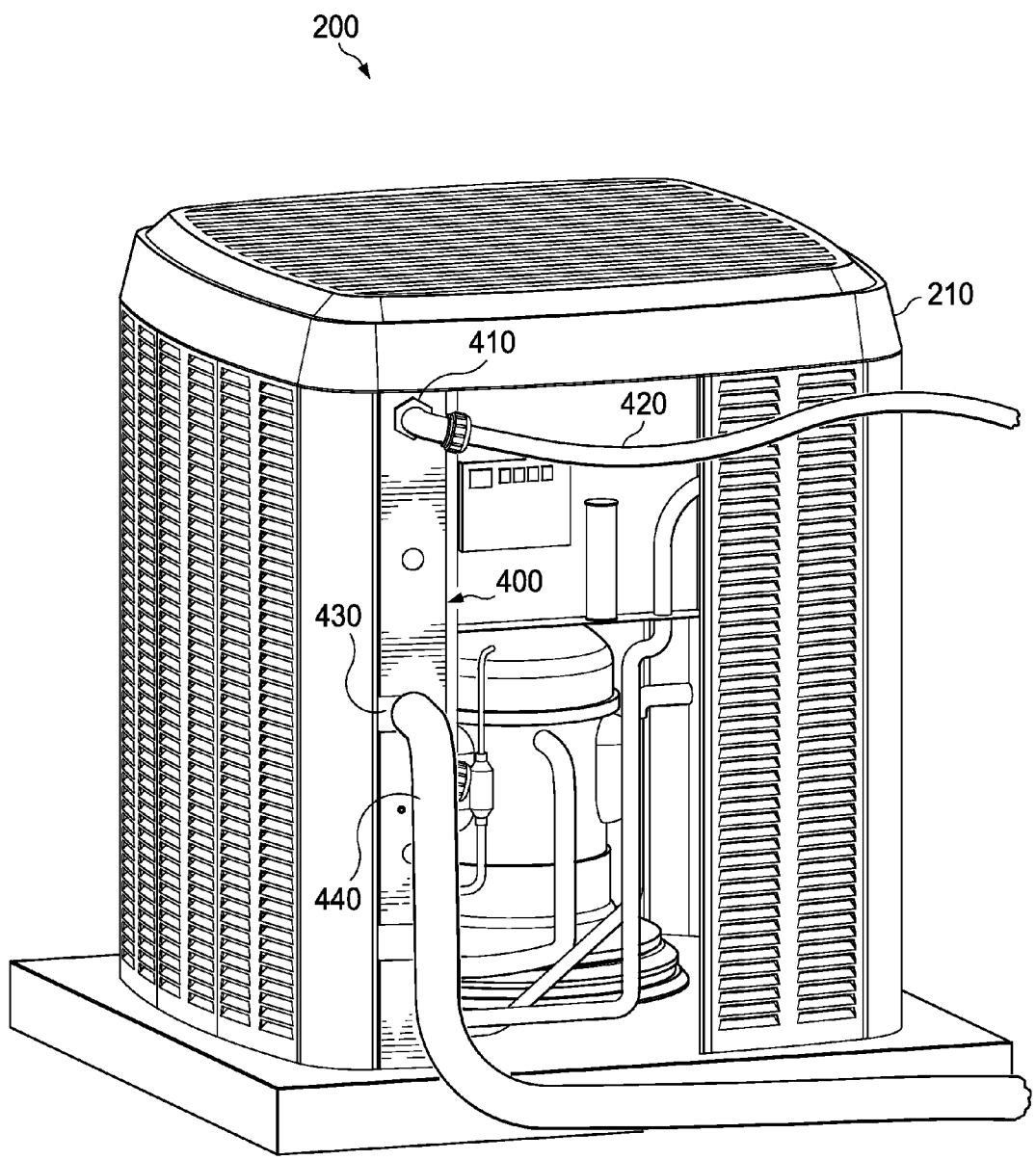
FIG. 4 is an isometric view of one embodiment of a portion of the outdoor unit of FIG. 2 with a conventional panel in place.

FIG. 4 is an isometric view of one embodiment of a portion of the outdoor unit 200 of FIG. 2 with a conventional electrical conduit panel 400 in place. The conventional panel 400 does not always, but instead only may, provide an aperture 410 located and sized such that an electrical conduit 420 can pass through or be terminated in the panel 400 when it is installed. The electrical conduit is configured to provide electric power to the outdoor unit from the grid (not shown). However, the conventional panel 400 lacks circuit protection elements and any other features that would also allow the panel 400 to accommodate a premises power source. The conventional panel 400 may also provide an aperture 430 configured to receive a refrigerant pipe 440 therethrough.

Figure 5:
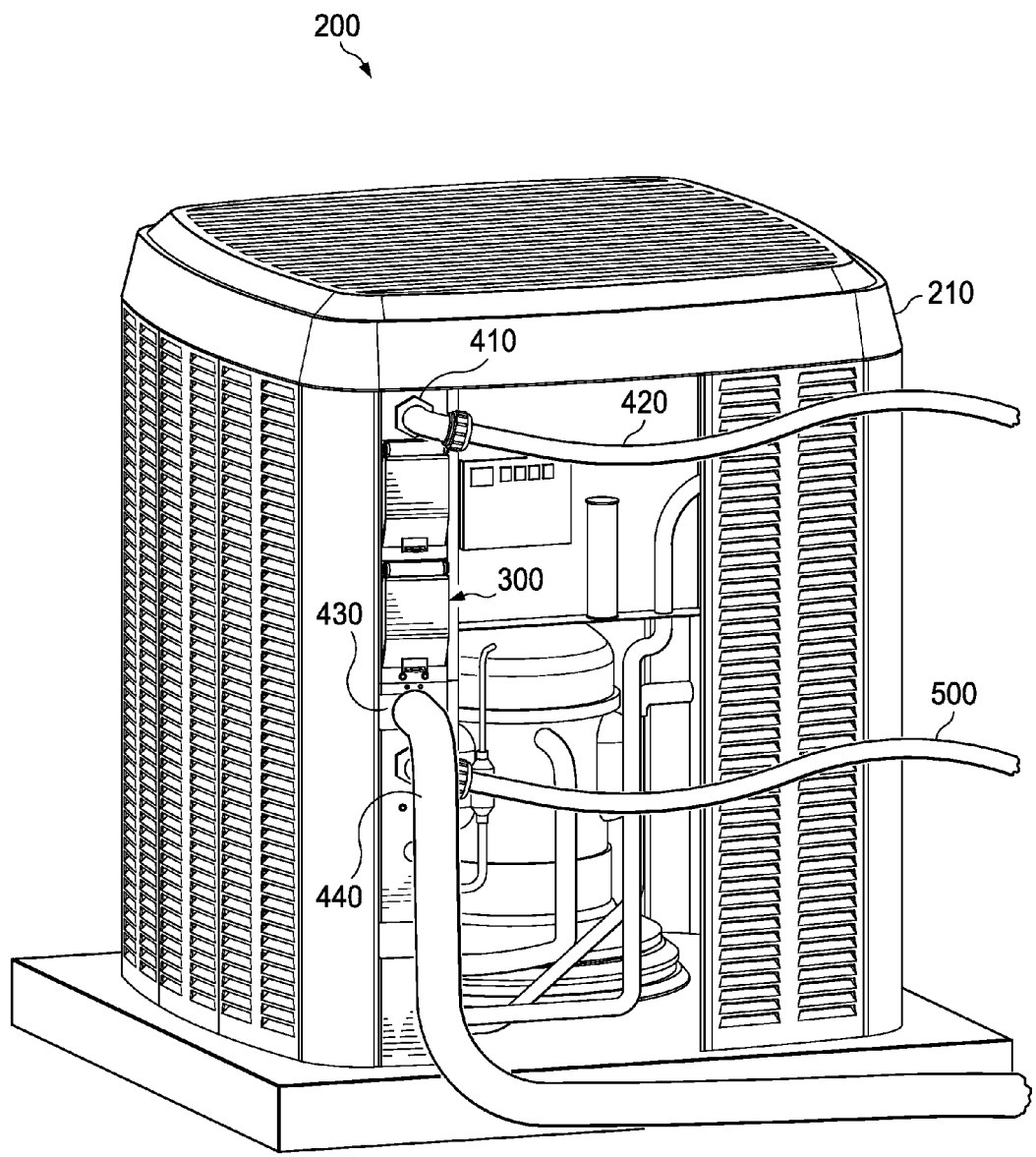
FIG. 5 is an isometric view of one embodiment of a portion of the outdoor unit of FIG. 2 with a one embodiment of a premises power source accessory panel in place in lieu of the conventional panel of FIG. 4.

FIG. 5 is an isometric view of one embodiment of a portion of the outdoor unit of FIG. 2 with one embodiment of a premises power source accessory panel 300 in place in lieu of the conventional panel of FIG. 4. The outdoor unit 200 of FIG. 5 is the same as the outdoor unit 200 of FIG. 4. FIG. 5 is presented primarily for the purpose of illustrating that the conventional electrical conduit panel 400 of FIG. 4 may be omitted at the outset, or installed at the outset and later removed, from the outdoor unit 200 and replaced with the premises power source accessory panel 300, thereby initially fitting, or later retrofitting, the outdoor unit 200 to accommodate a premises power source. The premises power source accessory panel 300 includes an aperture 410 located and sized such that an electrical conduit 420 can pass through or be terminated in the panel 400 when it is installed. The premises power source accessory panel 300 also provides a connection to a premises power source. In FIG. 5, this connection is made via a conduit 500 leading from the outdoor unit 200 to the premises power source (which FIG. 5 does not show). In the specific embodiment of FIG. 5, the premises power source is a solar panel. The conventional panel 400 may also provide an aperture 430 configured to receive a refrigerant pipe 440 therethrough.

Figure 6:
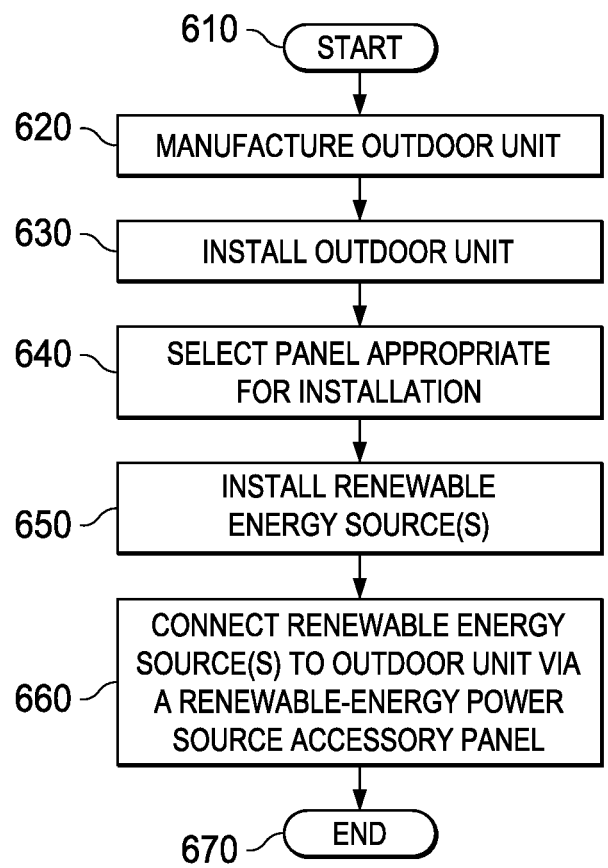
FIG. 6 is a flow diagram of one embodiment of a method of adapting an outdoor unit with a premises power source accessory panel.

FIG. 6 is a flow diagram of one embodiment of a method of adapting an outdoor unit with a premises power source accessory panel. The method begins in a start step 610. In a step 620, an outdoor unit is manufactured. It is not necessary that the design of the outdoor unit be dependent upon whether or not the outdoor unit is destined to receive power from a premises power source. Therefore, a single model of outdoor unit can be manufactured to accommodate installation either with or without a premises power source. In a step 630, the outdoor unit is installed at a particular premises. In a step 640, a panel appropriate to the installation is selected. If the installation is to include a premises power source, a premises power source accessory panel (e.g., the panel 300 of FIG. 3) may be selected. If the installation is to operate only off a premises electric power system and is not to have a premises power source, a conventional accessory panel (e.g., the panel 400 of FIG. 4) may be selected. Assuming the installation is to include at least one premises power source, any premises power sources (e.g., one or more photovoltaic cells, a wind turbine or a standby generator) are installed in a step 650, and, in a step 660, any such premises power sources are connected to the outdoor unit via the premises power source accessory panel. The method ends in an end step 670.

In one embodiment, the step 640 is carried out before the step 630 is carried out, such that the outdoor unit is shipped to the premises with the appropriate panel. In another embodiment, the steps 640, 650, 660 are carried out a substantial time (e.g., weeks, months or years) after the step 630 is carried out, such that an already installed outdoor unit that has not accommodated a premises power source is thereby retrofitted to accommodate a premises power source.

Those skilled in the art to which this application relates will appreciate that other and further additions, deletions, substitutions and modifications may be made to the described embodiments.

What is claimed is:

1. An outdoor unit of an HVAC system, comprising:
    a frame;
    at least one refrigerant coil mounted to said frame;
    a fan motor coupled to a fan and configured to drive air through said at least one refrigerant coil;
    a compressor coupled to said at least one refrigerant coil to drive refrigerant therethrough;
    a controller coupled to said fan motor and said compressor; and
    a premises power source accessory panel removably coupled to said frame and including:
        a bracket having at least one electrical conduit aperture, and
        a circuit protection element mounted to said bracket and coupleable to a premises power source, wherein said premises power source is a renewable-energy power source located on a premises of said HVAC system, said bracket removably coupleable to said outdoor unit in lieu of a conventional electrical conduit panel.

2. The outdoor unit as recited in claim 1 wherein said outdoor unit is a condensing unit of said HVAC system and said compressor is a refrigerant compressor.

3. The outdoor unit as recited in claim 1 wherein said outdoor unit is part of a heat pump system and said compressor is a heat pump.

4. The panel as recited in claim 1 wherein said bracket further includes at least one tab configured to engage corresponding slots on said outdoor unit.

5. The panel as recited in claim 1 further comprising a circuit protection element mounted to said bracket and configured to be coupled to said outdoor unit.

6. The panel as recited in claim 1 wherein said bracket includes a lateral bracket configured to mount a lightning surge arrestor.

7. The panel as recited in claim 1 wherein said bracket includes a first section and a second section coupled thereto by a joint, said first section sized to accommodate multiple models of said outdoor unit.

8. The panel as recited in claim 1 wherein a weather-resistant circuit protection element cover is associated with said circuit protection element.

9. A method of adapting an outdoor unit of an HVAC system with a premises power source accessory panel, comprising:
    selecting a panel appropriate for installation on said outdoor unit from the group consisting of:
        a conventional electrical conduit panel, and
        a premises power source accessory panel;
    installing said panel on said outdoor unit;
    connecting at least one premises power source to said outdoor unit via said panel if said panel is said premises power source accessory panel, wherein said premises power source is a renewable-energy power source located at a premises of said HVAC system; and
    mounting a lightning surge arrestor to a bracket of said premises power source accessory panel.

10. The method as recited in claim 9 further comprising installing said outdoor unit, said installing said outdoor unit being carried out before said selecting.

11. The method as recited in claim 9 further comprising installing said outdoor unit, said installing said outdoor unit being carried out after said selecting.

12. The method as recited in claim 9 further comprising installing said at least one premises power source.

* * * * *